(No Model.) 3 Sheets—Sheet 1.
A. FLEWELLEN, Sr.
COMBINED COTTON CHOPPER AND CULTIVATOR.
No. 342,691. Patented May 25, 1886.
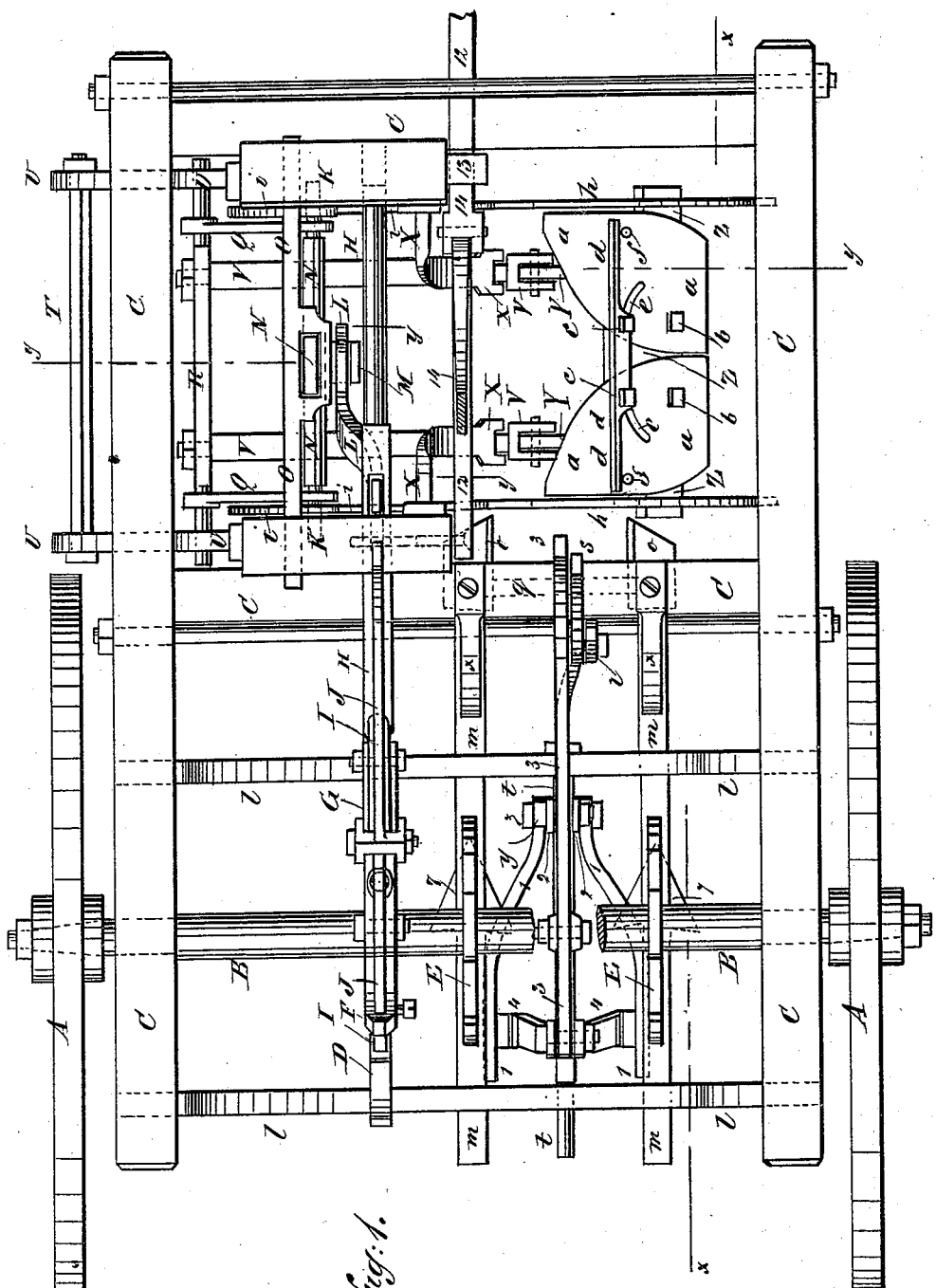
WITNESSES:
INVENTOR:
BY
ATTORNEYS.

(No Model.) 3 Sheets—Sheet 2.

A. FLEWELLEN, Sr.
COMBINED COTTON CHOPPER AND CULTIVATOR.

No. 342,691. Patented May 25, 1886.

WITNESSES:

INVENTOR:
A. Flewellen Sr.
BY Munn & Co.
ATTORNEYS.

(No Model.) 3 Sheets—Sheet 3.
A. FLEWELLEN, Sr.
COMBINED COTTON CHOPPER AND CULTIVATOR.
No. 342,691. Patented May 25, 1886.

UNITED STATES PATENT OFFICE.

ANTHONY FLEWELLEN, SR., OF BRENHAM, TEXAS.

COMBINED COTTON CHOPPER AND CULTIVATOR.

SPECIFICATION forming part of Letters Patent No. 342,691, dated May 25, 1886.

Application filed February 12, 1886. Serial No. 191,762. (No model.)

*To all whom it may concern:*

Be it known that I, ANTHONY FLEWELLEN, Sr., of Brenham, in the county of Washington and State of Texas, have invented a new and useful Improvement in a Combined Cotton Chopper and Cultivator, of which the following is a full, clear, and exact description.

Reference is to be had to the accompanying drawings, forming a part of this specification, in which similar letters of reference indicate corresponding parts in all the figures.

Figure 3:
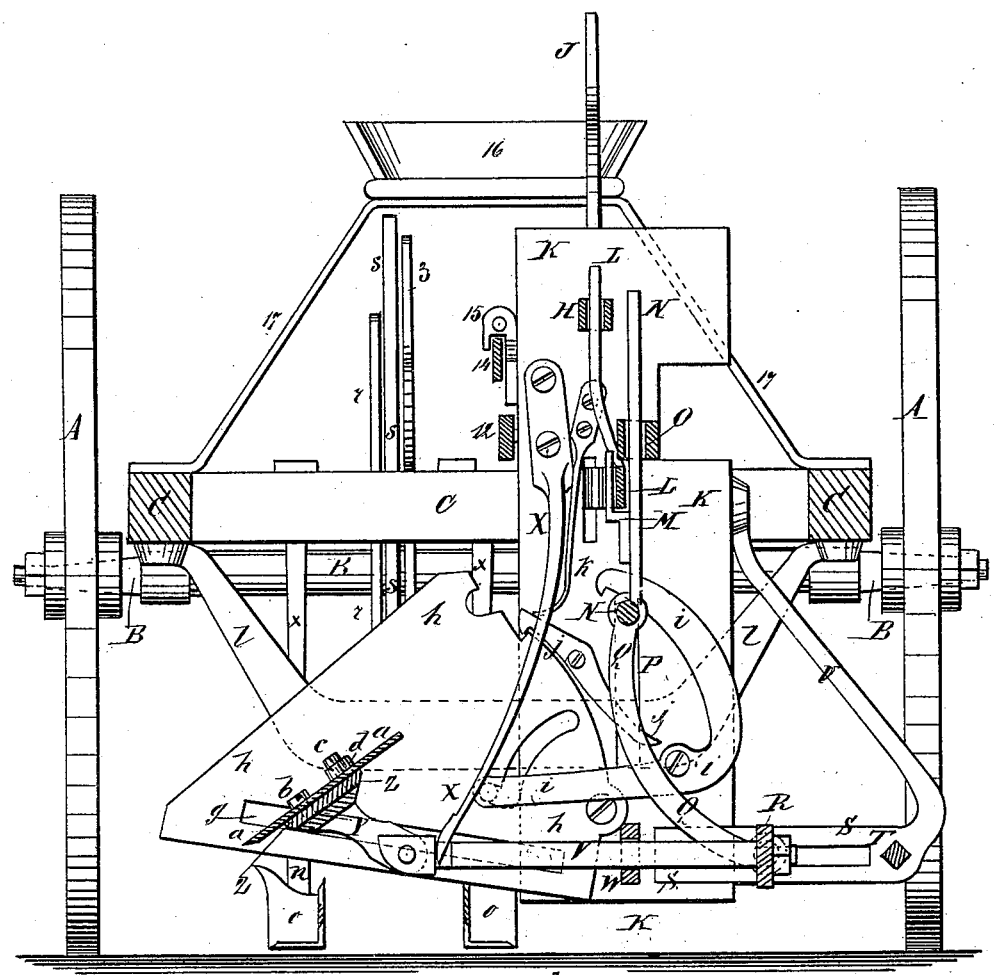
Figure 4:
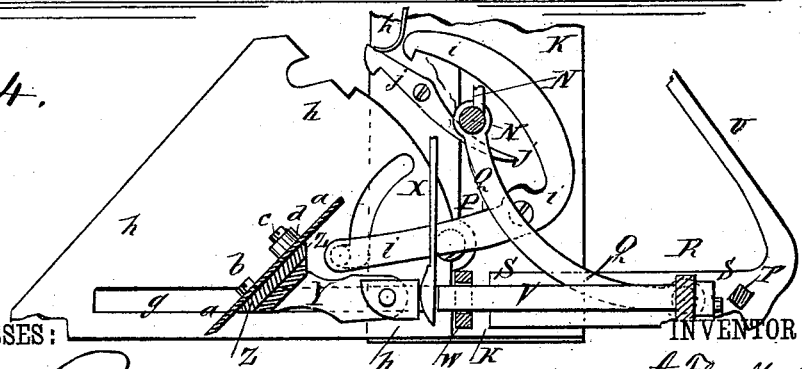

Figure 1 is a plan view of my improved machine. Fig. 2 is a sectional side elevation of the same, taken through the line $x$ $x$, Fig. 1. Fig. 3 is a sectional front elevation of the same, taken through the broken line $y$ $y$ $y$ $y$, Fig. 1, and showing the chopping-hoes in their outer position. Fig. 4 is a part of the same section as Fig. 3, but showing the chopping-hoes in their inner position, and parts being broken away.

The object of this invention is to provide combined cotton choppers and cultivators constructed in such a manner as to chop the cotton to a stand, remove dirt, weeds, and grass from the sides of the row, and dirt the plants as the machine is drawn along the row.

The invention consists in the construction and combination of various parts of the machine, as will be hereinafter fully described.

A represents the drive-wheels, which are rigidly attached to the axle B. The axle B revolves in bearings attached to the rear part of the horizontal frame C, and to the said axle are attached a large ratchet-wheel, D, and two smaller ratchet-wheels, E, for the purpose hereinafter described. The teeth of the large ratchet-wheel D are at a distance apart corresponding with the required distance apart of the hills as measured on the rims of the drive-wheels A. With the teeth of the large ratchet-wheel D engages the pawl F, the shank of which is pivoted to the slotted rear part of a bar, G, pivoted at its slotted forward end to the rear end of the bar H. The branches of the rear end of the bar G project at the opposite sides of the rim of the ratchet-wheel D, so as to keep the pawl F in place upon the said rim. The pawl F and bar G are held down by a spring, I, attached at its middle part to the middle part of the bar G, with its rear end resting upon the upper side of the rear part of the pawl F, and its forward end resting upon the upper side of the rear end of the bar H. The rear end of the pawl F is extended beyond the tooth of the said pawl, and is slightly curved upward, so as to come in contact with the rim of the ratchet-wheel D when the said pawl is carried forward by the revolution of the said ratchet-wheel and raises the said pawl out of gear. The rear end of the bar H is extended downward and rearward, and to it is pivoted the end of the slotted lower arm of the three-armed lever J. The end of the rear arm of the lever J is pivoted to the pawl F, and the forward arm of the said lever projects into such a position that it can be readily reached and operated by the driver from his seat to raise the pawl F away from the ratchet-wheel D, and thus prevent the chopper from operating.

The bar H slides in bearings in the upper parts of two uprights, K, attached to the front and central cross-bars of the frame C, and in the said sliding bar, between the said uprights, is formed a slot, through which passes the upper arm of the three-armed lever L. The rear arm of the three-armed lever L is pivoted in a slot in the middle part of the rear upright K, and its forward end rests in a keeper, M, attached to the vertical arm of the three-armed bar N, which arm slides up and down in a guide-slot in a bar, O, attached to the outer edges of the uprights K. The outer ends of the horizontal arms of the three-armed bar N slide up and down in grooves P in the inner sides of the uprights K, and to the outer parts of the said arms are hinged the upper ends of two bars, Q. The bars Q are curved to the rearward, and their lower ends are hinged to the end parts of a cross-bar, R, the ends of which slide in horizontal slots in the bars S. The forward ends of the bars S are secured to the lower rear parts of the uprights K. The rear ends of the slotted bars S are connected by a cross-bar, T, and are further strengthened in place by the braces U, the lower ends of which are formed upon or attached to the said outer ends of the bars S, and their upper ends are attached to the rear edges of the middle parts of the uprights K.

To the cross-bar R are attached the outer ends of two bars, V, which pass through guide-holes in a stationary cross-bar, W, attached at its ends to the lower parts of the uprights K. Upon the inner ends of the sliding bars V are formed slotted heads, against which rest the slotted lower ends of two springs, X, the upper ends of which are bolted or otherwise secured to the inner sides of the upper parts of the uprights K. The springs X are so formed as to force the sliding bars V inward with a strong pressure.

To the slotted heads of the sliding bars V are hinged the ends of a U-shaped bar Y, the bend of which is inclined, as shown in Figs. 3 and 4, and to the said bend is attached an inclined plate, Z, to serve as a seat for the chopping-hoes $a$. The chopping-hoes $a$ are secured at points at a little distance from their inner forward angles to the plate Z by bolts $b$. The chopping-hoes $a$ are further secured in place by bolts $c$, passing through holes in the widened middle part of the spring $d$, through curved slots $e$ in the chopping-hoes $a$, and through holes in the inclined plate Z. The slots $e$ are curved upon arcs of circles having their centers in the axes of the bolts $b$, so that the chopping-hoes $a$ can turn upon the said bolts $b$ as pivots through spaces limited by the lengths of the slots $e$. The ends of the spring $d$ rest against lugs $f$, formed upon or attached to the middle outer parts of the chopping-hoes $a$, as shown in Figs. 1 and 2. The inner rear corner of the chopping-hoes $a$ are rounded, so that the inner and rear edges of the said hoes will be in curved lines, and the forward parts of the outer side edges of the said hoes are slightly rounded, so that the said chopping-hoes can turn freely upon the pivot-bolts $b$ through the limits fixed by the lengths of the slots $e$. With this construction, as the hoes $a$ move forward to make a cut, the resistance of the soil against the edges of the said hoes will cause the hoes to turn more or less upon the pivot-bolts $b$, so that the chopping will be done with a sliding cut.

The ends of the inclined plate Z, or lugs formed upon the said ends, enter and slide in slots $g$, formed in the lower parts of the guard plates or shields $h$, which are pivoted at the lower parts of their inner edges to the uprights K. In the lower middle parts of the shields $h$ are formed short slots, to receive the bolts or rivets that pivot the forward ends of the lower arms of the levers $i$ to the said shields. The levers $i$ are pivoted to the lower rear parts of the uprights K, and their upper arms are curved upward and inward so as to pass above the end parts of the lower arms of the three-armed bar N, so that the said levers $i$ will be operated to raise the outer parts of the shields $h$ above the plants by the upward movement of the three-armed bar N. The shields $h$ are held in place, when raised, by the catch-pawls $j$, pivoted to the uprights K, and which engage with the recessed edges of the upper parts of the shields $h$, and are held against the rounded inner edges of the said shields $h$ by springs $k$, attached to the uprights K and bearing against the said pawls. The rear ends of the pawls $j$ project beneath the end parts of the lower arms of the three-armed bar N, so that the said pawls will be tripped to release the shields $h$ by the downward movement of the said three-armed bar N. With this construction, as the pawl F engages with a tooth of the ratchet-wheel D and is carried forward by the revolution of the said ratchet-wheel, it pushes the sliding bar H forward, which operates the three-armed lever L and forces the three-armed bar N downward, pushing back the sliding bars V and drawing back the chopping-hoes $a$. As the three-armed bar N about completes its downward movement it comes in contact with and trips the pawls $j$, so that the shields $h$ will drop across the row of plants just as the chopping-hoes $a$ are thrown forward by the springs X to make a cut, so as to protect the plants left for a stand from being injured and the soil around them from being disturbed by the blows of the said chopping-hoes.

$l$ are two bars placed in front and rear of the axle B, and at a lower level than the said axle. The middle parts of the bars $l$ are horizontal, and their end parts are inclined upward and outward, and are attached at their ends to the side bars of the frame C.

$m$ are plow-beams, which slide in apertures in the bars $l$ in such positions that the said plow-beams will be on the opposite sides of the row of plants being operated upon. The forward ends of the plow-beams $m$ are bent downward into an inclined position, and to them are jointed the upper ends of the standards $n$, to which the plows $o$ are attached, the said joints being so formed that the standards $n$ cannot swing back beyond and will be firmly supported in a working position, but can be swung forward to raise the plows from the ground. The plows $o$ are made with colters upon their inner side edges to cut through the soil, grass, weeds, vines, and roots at the sides of the plants, and thus prevent the said plants from being torn out of root by the action of the said plows.

The heads of the bolts that secure the plows $o$ to the standards $n$ project, and to them are hinged the lower ends of two short connecting-bars, $p$, the upper parts of which are perforated to receive the ends of a rod, $q$. The center of the rod $q$ passes through a hole in the lever $r$ a little above its angle, or in a lug formed upon the said part of the lever. The short arm of the lever $r$ projects to the rearward, and is pivoted at its end to the angle of the lever $s$. The long arm of the lever $r$ projects into such a position that it can be readily reached and operated by the driver from his seat to raise the plows $o$ from the ground to pass obstructions. The short arm of the lever $s$ projects to the rearward, and is pivoted at its end to a lug formed upon or attached to the bar $t$, placed midway between the plow-beams $m$, and secured at its ends to the cross-bars $l$.

Upon the rear end of the short arm of the lever $s$ is formed, or to it is attached, the center of a cross-bar, $u$, the arms of which project across the lower side of the plow-beams $m$, for the purpose hereinafter described. The long arm of the lever $s$ projects upward into such a position that it can be readily reached and operated by the driver from his seat.

The parts of the plow-beams $m$ beneath the ratchet-wheels E are slotted, and within the slots are pivoted hook-pawls $v$ to engage with the teeth of the said ratchet-wheels, so that the plow-beams and plows will be drawn back by the revolution of the ratchet-wheels E as the machine is drawn forward. The hook ends of the pawls $v$ are held up to engage with the teeth of the ratchet-wheels E by springs $w$, the outer ends of which are attached to the plow-beams $m$, and their inner ends rest against the under sides of the engaging ends of the said pawls $v$. The lower angles of the rear ends of the pawls $v$ project below the plow-beams $m$, and as the plow-beams $m$ move forward and back the said angles pass over the arms of the cross-bar $u$; but when the plow-beams $m$ are at the end of their forward movement and the lever $s$ is operated to raise the cross-bar $u$ against the lower side of the plow-beams the arms of the said cross-bar $u$ will press against the projecting lower angles of the rear ends of the pawls $v$ and hold the engaging ends of the said pawls down, so that they will not engage with the ratchet-wheels E, and the back and forward movements of the plow-beams $m$ will be stopped. The plow-beams $m$ are thrown forward, when the pawls $v$ are released from the ratchet-wheels E, by the springs $x$, the lower ends of which enter slots in the forward parts of the said plow-beams, and their upper ends are attached to the rear cross-bar of the frame C.

The plows $o$ are placed close in the rear of the chopping mechanism, and are designed to bar off the plants left for a stand.

Upon the upper side of the forward end of the central bar, $t$, is formed a short upwardly-projecting standard, $y$, which is slotted vertically to receive the bolt $z$, that connects the forward ends of the two plow-beams 1 with the said standard and with each other, so that the draft-strain of the said plow-beams will be sustained by the said standard. To the bolt $z$ are pivoted the lower ends of two short connecting-bars, 2, the upper ends of which are pivoted to the opposite sides of the middle part of the lever 3. The rear part of the lever 3 passes beneath the axle B, and is curved downward and then upward, so that the said axle will not interfere with the free movements of the said lever. To the rear end of the lever 3 is pivoted the slotted upper end of the connecting-bar 4, through the slot of which the center bar, $t$, passes, and to the lower end of which are attached laterally-projecting screws or bolts 5, to pass through holes in the rear parts of the plow-beams 1. The plow-beams 1 are secured in place upon the said screws or bolts 5 by nuts 6, screwed upon them upon the opposite sides of the said beams, so that the said beams can be adjusted at a greater or less distance apart by adjusting the said nuts.

The forward part of the lever 3 projects upward into such a position that it can be readily reached and operated to adjust the position of the plow-beams 1 or to raise the plows from the ground. The rear parts of the plow-beams 1 are bent downward and forward to adapt them to serve as standards for the plows 7. Upon the lower ends of the plow-beams 1 are formed upwardly-projecting lugs 8, which pass through apertures in the plows 7 and sustain the draft-strain upon the said plows.

Upon the lower parts of the plow-beams 1, at a little distance from their lower ends, are formed upwardly-projecting lugs 9, which are perforated to receive wooden pins 10. The wooden pins 10 pass through eyes in the rear ends of the stems 11, formed upon the rear edges of the plows 7, and which are slotted to receive the lugs 9. The wooden pins 10 are made of sufficient strength to hold the plows 7 in place under ordinary circumstances; but should the said plows strike an obstruction the said pins will break and allow the plows to turn back, and thus prevent the said plows from being broken.

The plows 7 are designed to dirt the plants after being barred off by the plows O.

The tongue 12 is pivoted at its rear end to the inner edge of the rear upright K, and passes through a long keeper, 13, attached to the inner edge of the forward upright K.

To the tongue 12 at the rear side of the forward upright K is pivoted a lever, 14, at a little distance from its forward end. The short forward arm of the lever 14 is bent upward slightly, passes through the keeper 13, and projects beneath the forward cross-bar of the frame C. The rear arm of the lever 14 is curved upward and rearward, and extends into such a position that its rear end can be readily reached and operated by the driver from his seat to raise and lower the machine. The lever 14 is held in place when the machine is raised by a catch, 15, attached to the inner edge of the rear upright K.

16 is the driver's seat, the supports 17 of which extend downward and outward, and are attached at their lower ends to the rear parts of the frame C, so that the driver's weight will be directly over the axle B.

Having thus fully described my invention, I claim as new and desire to secure by Letters Patent—

1. In a combined cotton chopper and cultivator, the combination, with the wheels A, axle B, frame C, and uprights K, of the ratchet-wheel D, the spring-pawl F, the sliding bar H, connected with the said spring-pawl, the three-armed lever L, connected with the said sliding bar, the three-armed sliding bar N, connected with the said three-armed lever, the curved connecting-bars Q, connected with the said three-armed bar, and the horizontal sliding frame V R, carrying the chopping-hoes, substantially as herein shown and described, whereby the said frame and chopping-hoes, after making a cut, are drawn back by the advance of the machine, as set forth.

2. In a combined chopper and cultivator, the combination, with the supporting-frame, a ratchet-wheel mounted on the axle of the drive-wheels, and a pawl engaging said ratchet-wheel, of the sliding frame R V, carrying the chopping-hoes, the springs X, secured to the frame and engaging the said sliding frame, and intermediate mechanism between the said pawl and sliding frame, substantially as herein shown and described.

3. In a combined cotton-chopper and cultivator, the combination, with the sliding frame R V, the chopping-hoes $a$, and the shields $h$, having slots $g$, of the U-shaped bar Y, hinged to the said frame, and the inclined plate Z, to which the chopping-hoes are attached, and provided with end lugs engaging with the shield-slots, substantially as herein shown and described, whereby the said hoes can be raised, lowered, and guided by the said shields, as set forth.

4. In a combined cotton chopper and cultivator, the combination, with the inclined plate Z and the chopping-hoes $a$, having bolt-holes and curved slots, and provided with lugs $f$, of the pivot-bolts $b$, the guide-bolts $c$, and the spring $d$, substantially as herein shown and described, whereby the resistance of the soil will adjust the chopping-hoes to give a sliding cut, as set forth.

5. In a combined cotton chopper and cultivator, the combination, with the uprights K, the shields $h$, pivoted to the said uprights, and the vertically-sliding three-armed bar N, of the pivoted bent levers $i$, connected with the said shields, the lever catch-pawls $j$, engaging with the said shields, and the springs $k$, engaging with the said catch-pawls, substantially as herein shown and described, whereby the said shields will be made to move up and down by the up-and-down movement of the said three-armed bar, as set forth.

6. In a combined cotton chopper and cultivator, the combination, with the sliding bar H, the pawl F, engaging with the ratchet-wheel D, and its spring I, of the bar G, connecting the said sliding bar and pawl, and the lever J, substantially as herein shown and described, whereby the said pawl can be readily raised to throw the chopping mechanism out of gear, as set forth.

7. In a combined cotton chopper and cultivator, the combination, with the wheels A, the axle B, and the beams $m$, sliding in bars $l$, attached to the frame C, and carrying the barring-off plows, of the ratchet-wheels E, attached to the said axle, the pawls $v$ and their springs $w$, secured to the said plow-beams, and the springs $x$, attached to the frame C and engaging with the said plow-beams, substantially as herein shown and described, whereby the said plow-beams and their plows will receive a back and forward movement from the advance of the machine, as set forth.

8. In a combined cotton chopper and cultivator, the combination, with the sliding plow-beams $m$ and the pivoted plow-standards $n$, of the connecting-bars $p$ and rod $q$, the elbow-lever $r$, pivoted to the said rod, and the elbow-lever $s$, pivoted to the first lever and to the bar $t$, connected with the machine-frame C, and provided with a cross-bar, $u$, at its lower end, substantially as herein shown and described, whereby the barring-off plows can be raised from the ground and the movements of their plow-beams prevented, as set forth.

9. In a combined cotton chopper and cultivator, the combination, with the beams 1 of the dirting-plows, and the bar $t$, connected with the machine-frame, and having slotted standard $y$, of the connecting-bars 2 4 and the bent lever 3, substantially as herein shown and described, whereby the said plow-beams will be drawn from the machine-frame and can be readily adjusted, as set forth.

ANTHONY FLEWELLEN, SR.

Witnesses:
GEORGE ISAACS,
THOS. B. BOTTS.